Dec. 15, 1970            M. D. USTIN            3,546,954
DEVICE FOR ACTUATING A LIMIT CONTROL ELEMENT
Filed July 22, 1966            2 Sheets-Sheet 1
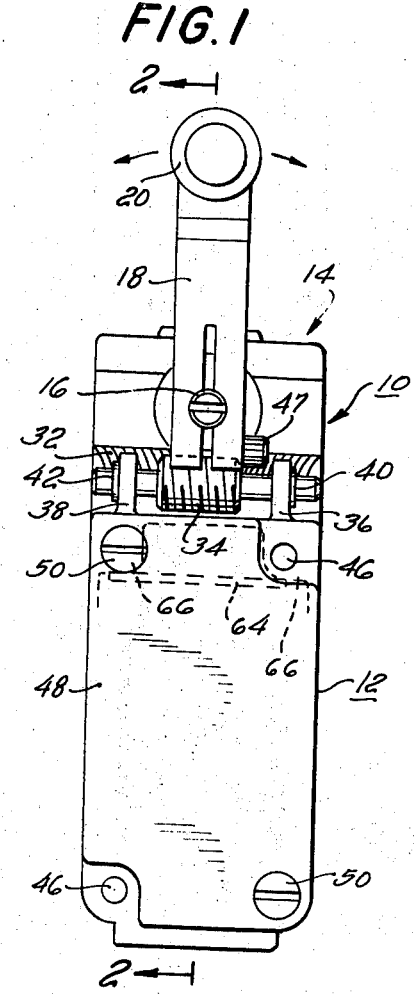
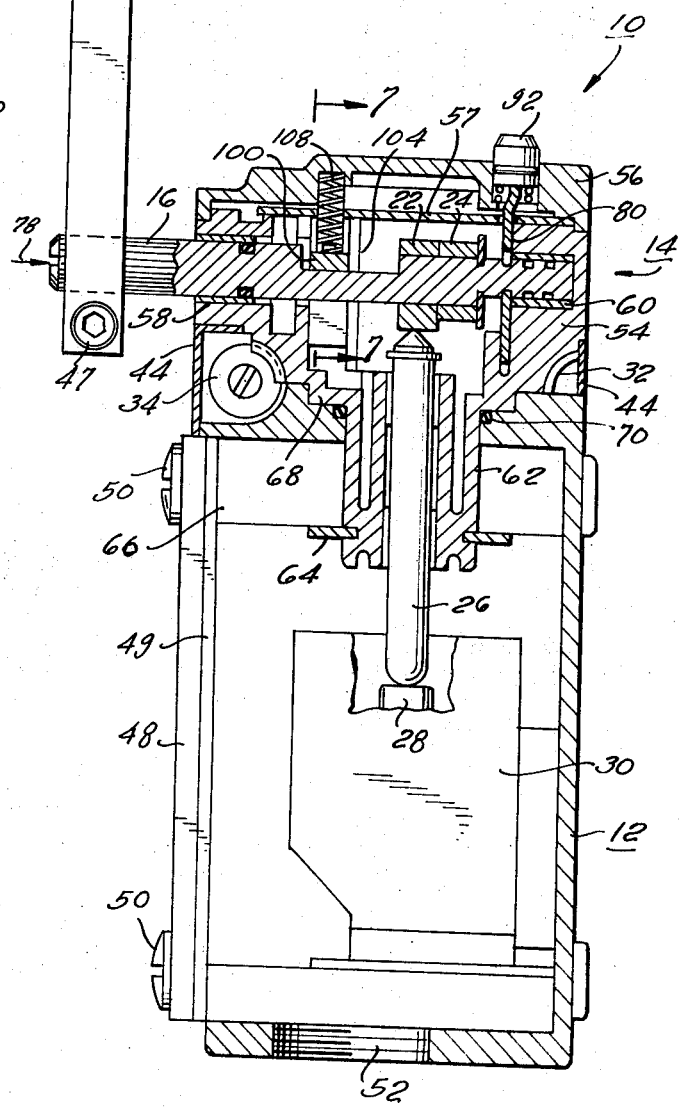
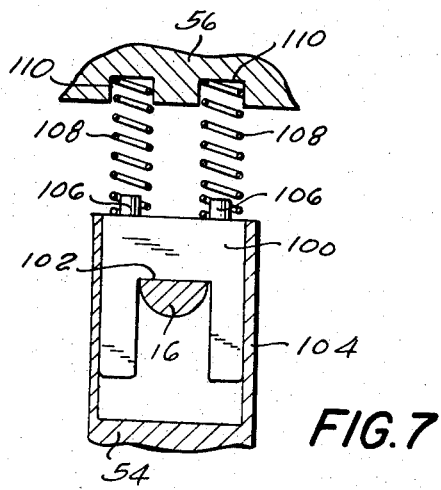
INVENTOR
MARTIN D. USTIN
BY
Curtis, Morris & Safford
ATTORNEYS Dec. 15, 1970　　　M. D. USTIN　　　3,546,954
DEVICE FOR ACTUATING A LIMIT CONTROL ELEMENT
Filed July 22, 1966　　　2 Sheets-Sheet 2

INVENTOR.
MARTIN D. USTIN
BY
Curtis, Morris & Safford
ATTORNEYS

United States Patent Office

3,546,954
Patented Dec. 15, 1970

3,546,954
DEVICE FOR ACTUATING A LIMIT
CONTROL ELEMENT
Martin D. Ustin, Union, N.J., assignor to Buchanan
Electrical Products Corporation, Union, N.J.
Filed July 22, 1966, Ser. No. 567,172
Int. Cl. F16h 21/44
U.S. Cl. 74—107                                    9 Claims

ABSTRACT OF THE DISCLOSURE

A device for actuating a limit control element such as a limit switch. The device has an actuating arm which is rotated to actuate the switch. The position of the arm is infinitely adjustable with respect to the body of the device so as to make it possible to actuate the arm from numerous different directions. Also, the arm is adjustable, without disassembling the device, to provide three modes of switch operation; one in which the switch is operated only by clockwise rotation of the arm, a second in which only counterclockwise arm rotation produces switch operation, and a third in which the switch is operated by rotation in either direction.

---

This invention relates to electrical switching devices; more particularly, this invention relates to electrical limit switches and means for mechanically actuating such limit switches.

A limit switch typically is used to stop a mechanical movement by turning off the energization to a motor causing the movement when the movement has proceeded as far as is desired. For example, the switch often is positioned near a machine to limit the movement of a cutting tool. The limit switch usually has an actuating arm or plunger with a roller on it. When a machine component contacts the roller and depresses the plunger or rotates the arm, this mechanical movement opens or closes an electrical switch so as to stop the movement of the machine component.

One problem with such prior limit switches is that the orientation of the actuating arm or plunger cannot easily be changed so as to properly engage machine components moving at various different angles. As a result, often it is necessary for the user of such switches to maintain a variety of different mounting brackets for mounting the switches, each bracket providing a different fixed angle for the actuating member. Furthermore, considerable labor is required in changing the brackets. Additionally, the provision of a variety of brackets does not provide infinite variability of position of the actuating arm. If a particular angular orientation is desired and a "standard" bracket is not suitable, a special bracket must be made at great cost.

One partial solution for the above problem which has been proposed is to make the switch mechanism in two parts, a switch housing and a "head" portion mounted on top of the housing with the actuating arm attached to the head portion. By loosening several mounting screws, turning the head with respect to the housing, and again tightening the mounting screws, the actuating member can be positioned in any one of four angular positions spaced 90° from one another. However, the provision of these four positions does not solve the problem because many other angular positions often are desired. Furthermore, the adjustment of the head position is time-consuming and costly. Also, multiple types of brackets often still must be maintained by the user in order to provide sufficient variability of the adjustment angle.

Accordingly, one object of the present invention is to provide a switching device with a switch actuating member infinitely positionable angularly with respect to the mounting structure of the device. It is another object of the present invention to provide such a device which is quickly and easily positionable with great accuracy, and which can be adjusted without disassembling the switch. It is a further object of the invention to provide such a device which is relatively simple to construct, reliable in operation, and inexpensive to manufacture.

Another problem is met in using the type of limit switch having a rotatable arm for an actuating member. This problem is that often it is desired to change the direction in which the arm is to be rotated in order to operate the switch. That is, in some uses it is desired to have the arm operate the switch only when the arm is rotated in a clockwise direction. In other instances, it is desired to have the arm operate the switch only when the arm is rotated in a counterclockwise direction. In still other uses of the switch, it is desired to have the arm operate the switch both when it is rotated clockwise and when it is rotated counterclockwise.

Prior art limit switches have provided a certain amount of variability of the actuation direction. However, the amount of effort required to change the actuation direction has been considerable, and it is believed that all three of the above-described modes of operation have not been provided in any one practical device.

Accordingly, it is another object of the present invention to provide switching device with a rotatable actuating arm, the device being capable of being adjusted easily and simply to vary the direction of switch actuation, and can be adjusted to provide all three of the above-described modes of operation. It is another object of the present invention to provide such a device whose actuating arm is infinitely positionable angularly with respect to the support member of the device, and to provide a simple, reliable and versatile limit switch.

Other objects and advantages of the present invention will be pointed out in or apparent from the following description and drawings.

In the drawings:

FIG. 1 is a front elevation view of a preferred embodiment of the invention;

FIG. 2 is a partially broken-away cross-sectional view taken along line 2—2 of FIG. 1;

FIG. 7 is a cross-sectional view taken along line 7—7 of FIG. 2.

Figure 3:
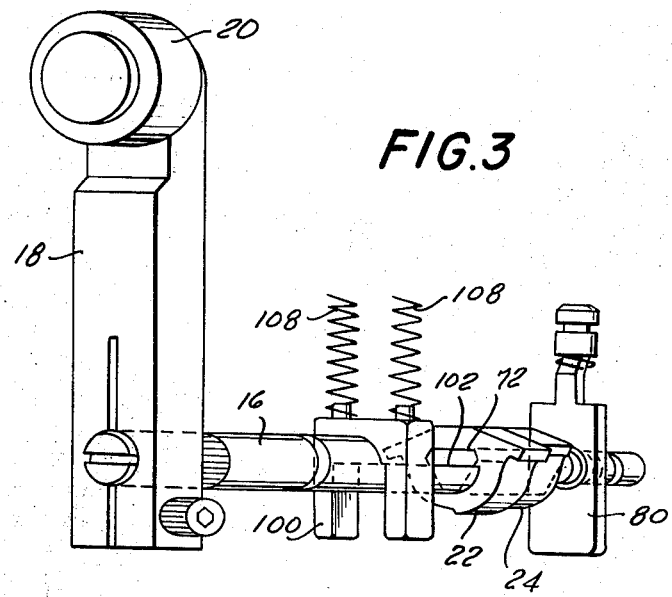
FIG. 3 is a perspective view of several of the components of the structure shown in FIGS. 1 and 2.

FIGS. 1 and 2 show a limit switch 10 including a switch housing 12, a cam housing or "head" 14 rotatably mounted on the switch housing 12, a cam shaft 16 rotatably mounted in the head 14, and an actuating arm 18 secured to the shaft 16. The actuating arm 18 has a roller 20 mounted at its outermost end. Two cams 22 and 24 are mounted on shaft 16 and engage a cam-follower rod 26. Cam follower rod 26 engages a spring-biased switch button 28 of a conventional snap-acting switch 30 which is mounted in the switch housing 12.

Briefly, the switch 10 operates as follows: The physical object whose motion is to be limited moves into contact with the roller 20 and rotates the arm 18 and shaft 16 either clockwise or counterclockwise from a neutral starting position. The rotation of shaft 16 rotates cams 22 and 24, thus causing the cam-follower rod 26 to be pushed downwardy against the switch button 28 of switch 30. The depression of button 28 causes the contacts of the switch 30 to snap open or shut. When the physical object moves away from the roller 20, the arm 18 returns to its neutral position under the influence of a spring return mechanism, to be described below, and the switch button 28 is returned to its uppermost position in which the contacts of the switch are once again in their initial condition.

In accordance with the present invention, the arm housing or head 14 is rotatably mounted on the switch housing 12. Head 14 is substantially cylindrical in shape and has screw threads 32 cut into its lower edge. As is shown in FIG. 2, a worm gear 34 is rotatably mounted on a pair of tabs 36 and 38 extending upwardly from a recessed portion of the housing 12. The worm member 34 is held in position by means of a pair of snap-rings 40 and 42 which are fitted into grooves in the shaft portion of the worm member 34 near the tabs 36 and 38. The worm gear 34 meshes with the teeth 32 cut in the lower edge of the head 14. Its shaft has slotted ends (see FIG. 2) so that the worm can be turned by means of a screwdriver. Thus, the angular position of the head 14 with respect to the housing 12 can be varied infinitely through a full circle merely by turning the worm 34 with a screwdriver. The worm gear firmly locks the head 14 so that it will not turn after it has been set to a desired position.

A cover 44 (shown only in FIG. 2) is positioned around the worm 34 and the threads 32 in order to protect them from dust and dirt. The cover 44 is marked with degree markings (not shown) so as to indicate the relative position of the head 14 with respect to the switch housing 12. In accordance with the present invention, the slotted gears of the worm shaft are exposed so that the position of the actuating arm 18 can be adjusted from the outside without entering either housing 12 or 14.

The housing 12 has a pair of mounting holes 46 (see FIG. 1) by means of which it can be mounted on any convenient support structure. Special mounting brackets normally are not required because infinite angular adjustment of the arm 18 is provided by the worm gear 34 and rotatable head 14. Adjustment of the position of arm 18 on shaft 16 can be made by loosening a screw 47 which draws the split lower ends of the arm 18 together and causes the arm to grip the shaft.

A removable front cover plate 48 and a gasket 49 are secured to the front of the housing 21 by means of a pair of screws 50. The gasket 49 provides a water, oil and dirt-tight seal for the cover. A threaded hole 52 is provided in the bottom of the housing for an electrical connector to lead wires from the switch 30 to external electrical circuitry.

Referring now to FIG. 2, the cam head 14 includes a body portion 54, and a cover 56 and gasket 57 which are held in place on the body portion 54 by means of screws (not shown). A horizontal hole is provided into which the shaft 16 is fitted. This hole is lined with bearings 58 and 60 against which the shaft 16 rotates. The body portion 54 has a vertical cylindrical portion 62 which extends downwardly into the housing 12. The cam follower rod 26 is mounted slidably in a central hole in the cylindrical portion 62. A snap-ring 64 fits into a groove near the end of portion 62, and abuts against the undersides of horizontal ledges 66 (see FIG. 1) through which pass the mounting holes 46 and the holes for screws 50. The body member 54 has a downwardly-extending annular portion 68 fitted into an annular recess in the top of the housing 12. The junction between portion 68 and housing 12 is sealed by means of a sealing ring 70, thus providing an impervious seal. There is relatively tight frictional engagement at this point between the head 14 and the switch housing 12. This tends to aid the worm 34 in holding the head in the position to which it is adjusted.

Figure 4:
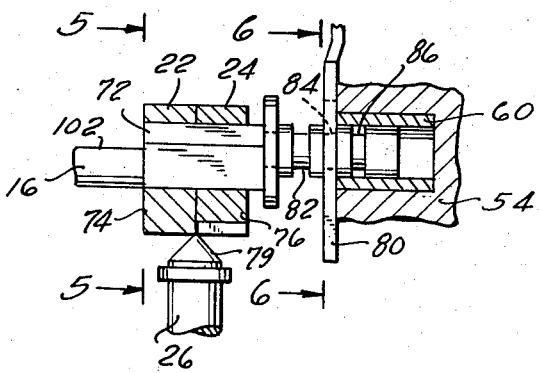
FIG. 4 is an enlarged, partially broken-away view of a portion of the structure shown in FIGS. 1 through 3.
Figure 5:
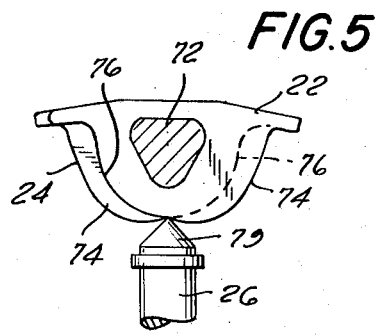
FIG. 5 is a cross-sectional view taken along line 5—5 of FIG. 4.

Referring now to FIGS. 3 through 7, the cams 22 and 24 are mounted on a portion 72 of the shaft 16 which is of generally triangular cross-section, with the points of the triangle being rounded (see FIG. 5). In accordance with one advantageous feature of the present invention, the cams 22 and 24 are identical but are mounted on the shaft portion 72 in opposed relationship to one another. Each has an eccentrically located hole shaped to fit relatively tightly onto the shaft portion 72. Each cam has a camming portion 74 and an idler portion 76 of smaller diameter than the camming portion 74. The camming portion 74 depresses the follower 26 when it contacts the follower, whereas when the "dwell" portion 76 contacts the follower 26, it does not depress the follower.

As indicated above, the cams 22 and 24 are placed on the shaft in opposed relationship. That is, the cam 22 is mounted with its cam portion 74 facing outwardly from the drawing as shown in FIG. 4, whereas the cam 24 is turned around and mounted with its cam portion facing rearwardly as shown in FIG. 4.

The shaft 16 is mounted so as to be movable longitudinally in the head 14. It is thus movable to three different positions each of which provides a different mode of actuation of the switch 30 by the arm 18. Referring again to FIG. 2, when the shaft 16 is pushed inwardly in the direction indicated by arrow 78, the right end of shaft 16 is positioned near the rearmost portion of the horizontal hole in head 14, and the rounded, partially conical upper end 79 of cam follower 26 contacts only cam 22. As a result, the switch 30 is actuated only when the arm 18 is rotated in a clockwise direction from its position shown in FIG. 1. This is because only the engagement of camming portion 74 of cam 22 causes the depression of the cam follower, and this happens only when the arm 18 is rotated in a clockwise direction.

Conversely, when the shaft 16 is pulled outwardly to its outermost position (not shown in the drawings), the cam follower tip 79 contacts only the cam 24. Since the camming surface 74 of cam 24 depresses the follower 26 only when the arm 18 rotates in a counterclockwise direction, the switch 30 is operated only by the counterclockwise and not by the clockwise rotation of arm 18.

The shaft 16 may be moved longitudinally to a third position located between the innermost and outermost positions. This position is shown in FIG. 4. When the shaft 16 is in this position, the tip 79 of cam follower 26 engages the surfaces of both cams 22 and 24. Thus, the follower 26 is depressed not only when the arm 18 is rotated clockwise, but also when it is rotated in the counterclockwise direction.

Figure 6:
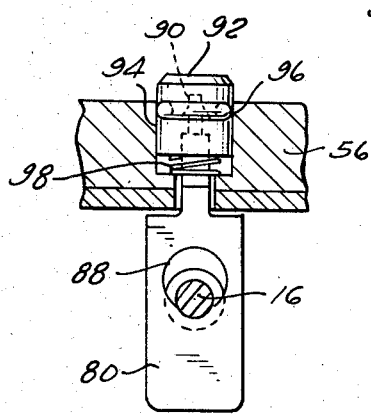
FIG. 6 is a cross-sectional view taken along line 6—6 of FIG. 4.

When a mode of actuation has been selected, it is desired to lock the shaft 16 in the position selected. This is accomplished by means of a locking member 80, which is shown in FIGS. 4 and 6 as well as FIG. 2. Three longitudinally spaced grooves 82, 84 and 86 are positioned along the right end of shaft 16. Locking member 80 has a rectangularly-shaped lower portion with an approximately centrally-located hole 88 with an extended lower portion of smaller diameter. The right end of the shaft 16 passes through the hole 88. Locking member 80 has a pointed upper end portion 90 with a pointed tip upon which is fitted a button 92, preferably of plastic and press-fitted onto the pointed end 90. Button 92 moves upwardly and downwardly in a recess 94 in the cover 56 of the head 14. An O-ring seal 96 is provided to keep the head 14 sealed. A spring 98 is positioned between the bottom of the recess 94 and the undersurface of the button 92 so as to normally thrust the locking member 80 upwardly.

When it is desired to shift the shaft 16 inwardly or outwardly, the button 92 is depressed by the user. This causes the member 80 to move downwardly out of one of the slots 82, 84 or 86. Then the shaft 16 is pushed or pulled inwardly to a new position, the button 92 is released, and the spring 98 pulls the locking member 80 upwardly into a different one of the grooves 82, 84 or 86. The spring 98 holds the member in the groove and thus locks it in the position selected.

It can be seen from the foregoing that it is quite easy to change the actuation mode of the switch 10. The operator need merely press the button 92, push or pull the shaft 16 to the desired position, and release the button. This is a decided advantage over prior devices in which the shifting is time-consuming and complicated. Moreover, it provides for three modes of actuation; clockwise, counter-clockwise and a combination of clockwise and counter-clockwise actuation.

It is desired to provide a spring return for the arm 18 so that it will remain in a neutral position after being rotated. This spring return function is provided by the arrangement shown in FIGS. 7 and 2. An inverted U-shaped member 100 is fitted over a portion of the shaft 16 which has a flattened upper surface 102. The member 100 slides upwardly and downwardly in a vertical guide structure 104. The member 100 has a pair of projections 106 over each of which is fitted a coil spring 108. The upper end of each coil spring 108 fits into a recess 110 in the lower surface of the cover 56.

When the shaft 16 is turned either clockwise or counter-clockwise, one edge of the flattened portion 102 lifts the member 100 upwardly and compresses the springs 108. When the rotating force is removed from the actuating arm 18, the springs 108 thrust the member 100 downwardly and return the shaft 16 to its neutral position with the flattened portion flush against the corresponding flattened portion of the member 100.

One significant advantage of this spring return arrangement is the provision of twin springs 108 instead of only a single spring. Limit switches must have a very high degree of reliability; that is, they often must be able to withstand millions of operations without malfunction. Each of the springs 108 is strong enough to alone return the arm 18 to its neutral position without the aid of the other spring. Thus, if one of the springs should break, the switch will continue operating. This increases the reliability of the switch 10 substantially.

Another advantageous feature of the present invention is that removal of the cam head 14 is quite simple. The head 14 may be removed by removing the cover 48 and the lock ring 64, and lifting the head 14 from the switch housing 12. Thus, if and when the head portion should become worn out, a whole new switching device need not be purchased, and the switch need not be removed from its mounting. Instead, a new head may be used to replace the old head. Also, different types of heads may be used as desired, without changing the mounting of the housing 12.

It should be noted that the switching device 10 is unique in the further respect that despite the fact that the head 14 can be adjusted to any position within a full circle, such adjustment does not in any way affect the mode of actuation selected for the switching mechanism. The rod 26 is located along the axis of rotation of the head 14, and has a symmetrical conical end 79 with a hemispherically-shaped tip. Thus, the relationship between the cam follower and the cams 22 and 24 remains the same throughout any rotation of head 14.

The switching device 10 provides many cost savings to its user. First, the user does not need to stock a large number of mounting brackets to provide variable angular positioning of the arm 18. Instead, by a simple adjustment easily performed by the use of a screwdriver entirely from the outside of the switching device, he can position the arm to any angular position he desires. This adjustment can be made without breaching the sealed enclosure of the switching mechanism, thus preventing foreign matter from reaching the internal switch components and substantially increasing the life of the device.

Because of the great versatility of switches made in accordance with the present invention, the user need not stock as many different types of them as he would prior switches. This provides another very significant cost saving to the user.

As explained above, the switching device 10 has three different modes of actuation, each of which can be selected without the use of any tools whatsoever. Moreover, the cam housing 14 and the switch housing 12 need not be opened to provide this adjustment, thus maintaining the enclosure for the switch 30 and the components in the housing 14 in a sealed condition. Moreover, the switch 10 is relatively inexpensive to produce. The novel use of two identical cams 22 and 24 instead of a complicated single cam provides notable cost savings.

The above description of the invention is intended to be illustrative and not limiting. Various changes or modifications in the embodiments described may occur to those skilled in the art and these can be made without departing from the spirit or scope of the invention as set forth in the claims.

What is claimed is:

1. Apparatus for actuating a motion-limiting control element, said apparatus comrising, in combination, a first member, said control element being mounted on said first member, a second member rotatably secured to said first member, an actuating member, means for movably mounting said actuating member on said second member for engaging said actuating member with said control element and actuating said control element in response to movement of said actuating member relative to said second member, and means for rotating said second member relative to said first member through an indefinite number of positions in response to the receipt of a driving force applied to said rotating means, and for holding said second member against rotation relative to said first member when said second member is in a selected one of said positions.

2. Apparatus as in claim 1 in which said first and second members are housings, said control element being mounted in the first housing, and including a shaft secured to said second housing and journaled in an opening in said first housing, and a snap fitting securing the shaft against movement out of the first housing.

3. Apparatus as in claim 1 in which said holding means includes a worm gear on one of said first and second members and gear teeth on the other of said first and second members, the teeth of said worm being meshed with said gear teeth.

4. Apparatus as in claim 1 in which said first and second members are housings, and in which said holding means includes a worm gear on one of said first and second housings and gear teeth on the other of said first and second housings, the teeth of said worm being meshed with said gear teeth, said worm having a shaft with at least one end being exposed to the exterior of said housings and adapted for being gripped for turning and rotation of the second housing.

5. Apparatus as in claim 3 in which said second member is a substantially cylindrical housing, said worm gear being mounted on said first member, said gear teeth being formed in the lower edge of the exterior of said housing.

6. Apparatus for actuating a motion-limiting control element, said apparatus comprising, in combination, a first member, said control element being mounted on said first member, a second member rotatably secured to said first member, a shaft, means for mounting said shaft on said second member so that said shaft is rotatable and movable longitudinally with respect to said second member, cam means having separate portions spaced apart longitudinally on said shaft, each of said separate portions being shaped to move said cam follower upon the rotation of said shaft in one direction but not in the other, said one direction for one of said portions being opposite to said one direction for another of said portions, and means for holding said second member against rotation with respect to said first member at one of a plurality of positions of rotation of said second member with respect to said first member.

7. Apparatus as in claim 6 in which the point of engagement between said cam follower and said cam lies upon the axis of rotation of said second member, and the shape of said follower at said point of engagement is symmetrical with respect to said axis.

8. Apparatus for actuating a motion-limiting control element, said apparatus comprising, in combination, a first member, said control element being mounted on said first member, a second member rotatably secured to said first member, a shaft, means for mounting said shaft on said second member so that said shaft is rotatable and movable longitudinaly with respect to said second member, cam means having separate portions spaced apart longitudinally on said shaft, each of said separate protions being shaped to move said cam follower upon the rotation of said shaft in one direction but not in the other, said one direction for one of said portions being opposite to said one direction of another of said portions, a worm gear on one of said first and second members and gear teeth on the other of said first and second members, the teeth of said worm being meshed with said gear teeth for holding said second member against rotation with respect to said first member at one of a plurality of positions of rotation of said second member with respect to said first member.

9. Apparatus for actuating a motion-limiting control element, said apparatus comprising, in combination, a first member, said control element being mounted on said first member, a second member rotatably secured to said first member, a shaft, means for mounting said shaft on said second member so that said shaft is rotatable and movable longitudinally with respect to said second member, two cams mounted on said shaft to form separate cam portions spaced apart longitudinally on said shaft, each of said cams being substantially identical to the other cam, each of said cams being positioned on said shaft in an orientation opposite to that of the other cam, each of said cam portions being shaped to move said cam follower upon the rotation of said shaft in one direction but not in the other, said one direction for one of said portions being opposite to said one direction for the other of said portions, releasable means for locking said shaft in each of a plurality of longitudinal positions, said means being releasable from the outside of said second housing, and means for holding said second member against rotation with respect to said first member at one of a plurality of positions of rotation of said second member with respect to said first member.

References Cited

UNITED STATES PATENTS

| | | | |
|---|---|---|---|
| 3,260,375 | 7/1966 | Lemelson | 200—47X |
| 3,303,298 | 2/1967 | Dobes | 200—47 |
| 3,306,997 | 2/1967 | Jacobs | 200—47 |
| 3,310,778 | 3/1967 | Grundfest et al. | 200—46 |
| 2,474,945 | 7/1949 | Johnson | 200—47 |
| 2,519,907 | 8/1950 | Hodgson | 200—47 |
| 3,126,460 | 4/1964 | Dufour | 200—47 |
| 3,252,345 | 5/1966 | Russell | 200—47 |
| 3,275,764 | 9/1966 | Kiessling | 200—47 |

OTHER REFERENCES

| | | | |
|---|---|---|---|
| 1,100,670 | 4/1955 | France | 74—568 |

HERMAN O. JONES, Primary Examiner

D. SMITH, JR., Assistant Examiner

U.S. Cl. X.R.

200—47; 74—425, 469, 568